United States Patent
Hall et al.

(10) Patent No.: US 10,718,129 B2
(45) Date of Patent: Jul. 21, 2020

(54) HOUSING FOR DIGITAL ASSISTANT

(71) Applicants: David R. Hall, Provo, UT (US); Jerome Miles, Spanish Fork, UT (US); Christopher Jones, Spanish Fork, UT (US); Casey Webb, Spanish Fork, UT (US)

(72) Inventors: David R. Hall, Provo, UT (US); Jerome Miles, Spanish Fork, UT (US); Christopher Jones, Spanish Fork, UT (US); Casey Webb, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/947,076

(22) Filed: Apr. 6, 2018

(65) Prior Publication Data

US 2019/0003196 A1    Jan. 3, 2019

Related U.S. Application Data

(60) Provisional application No. 62/528,281, filed on Jul. 3, 2017.

(51) Int. Cl.
| | |
|---|---|
| *E04H 6/42* | (2006.01) |
| *G06F 1/16* | (2006.01) |
| *G06F 3/16* | (2006.01) |
| *G07C 9/00* | (2020.01) |

(52) U.S. Cl.
CPC ............ *E04H 6/42* (2013.01); *G06F 1/1656* (2013.01); *G06F 3/167* (2013.01); *G07C 9/00896* (2013.01); *G07C 2009/00928* (2013.01)

(58) Field of Classification Search
CPC .............. E04H 6/42; G07C 9/00896; G07C 2009/00928; G06F 3/167; G06F 1/1656
See application file for complete search history.

(56) References Cited

U.S. PATENT DOCUMENTS

| | | | | | |
|---|---|---|---|---|---|
| 4,638,433 | A | * | 1/1987 | Schindler | E05F 15/668 160/189 |
| 5,234,360 | A | * | 8/1993 | Kramer, Jr. | H01R 25/003 439/367 |
| 5,969,637 | A | * | 10/1999 | Doppelt | G07C 9/00817 318/266 |
| 7,996,231 | B2 | * | 8/2011 | Mays | G10L 15/26 704/270 |
| 9,978,265 | B2 | * | 5/2018 | McNabb | G08C 17/02 |
| 10,015,898 | B2 | * | 7/2018 | Whitmire | E05F 15/43 |

(Continued)

*Primary Examiner* — Jinhee J Lee
*Assistant Examiner* — Theron S Milliser (57) ABSTRACT

A housing for a digital assistant is disclosed. The housing includes; a body holding the digital assistant; attachments for an overhead mounting system. Within the housing there is at least one electrical input; and at least one electrical output; along with a digital current limiter. The digital assistant is capable of receiving and implementing instructions via voice commands or a personal control device. The digital current limiter receives instructions from the digital assistant and in response to those instructions, regulates the current to components in communication with the digital assistant. A method for using the housing and digital assistant to create a smart garage system by regulating access to connected components is also disclosed.

20 Claims, 6 Drawing Sheets

(56) References Cited

U.S. PATENT DOCUMENTS

| | | | |
|---|---|---|---|
| 2005/0212681 A1* | 9/2005 | Dzurko | G08B 21/14 340/632 |
| 2006/0202815 A1* | 9/2006 | John | G08B 21/14 340/531 |
| 2007/0046232 A1* | 3/2007 | Mullet | G07C 9/00309 318/280 |
| 2007/0063815 A1* | 3/2007 | Tsui | G07C 9/00182 340/5.71 |
| 2007/0132413 A1* | 6/2007 | Mays | G10L 15/26 318/280 |
| 2010/0171588 A1* | 7/2010 | Chutorash | G07C 9/00182 340/5.71 |
| 2012/0250205 A1* | 10/2012 | Pfitzer | H02H 9/041 361/91.1 |
| 2012/0261988 A1* | 10/2012 | Byrne | H02J 3/00 307/35 |
| 2017/0294113 A1* | 10/2017 | McNabb | G08C 17/02 |
| 2017/0295658 A1* | 10/2017 | Whitmire | H05K 5/0247 |
| 2018/0131189 A1* | 5/2018 | Ha | H02J 3/00 |
| 2018/0248382 A1* | 8/2018 | Hall | H02J 1/00 |

\* cited by examiner

HOUSING FOR DIGITAL ASSISTANT

CROSS REFERENCE TO RELATED APPLICATION

This application is a continuation-in-part of U.S. Provisional Application No. 62/528,281 filed Jul. 3, 2017, the entire contents of which are incorporated herein by reference.

TECHNICAL FIELD

This invention relates generally to the Internet of Things and more specifically to smart home devices.

BACKGROUND

Garages are used for a variety of purposes, some garages are for storage and organization, particularly of tools and toys for outside use; other garages are used as workshops. Whatever the garage is used for they are generally places where dust and other particles are constantly moving around and settling on exposed surfaces. Most electronic devices are not designed for use in dirty or dusty environments, in fact dust and dirt are generally believed to be detrimental to electronics. Garages are also the least weatherproof place in any house; this lower weatherproofing can lead to increased chances of water and moisture in the garage. These environmental challenges necessitate that those desiring to utilize a digital assistant for controlling connected devices protect the digital assistant.

Tools, especially power tools are essential to accomplishing many tasks. There are certain tools that are specialized and expensive, there are also locations where a diversity of people with differing experience levels and responsibility levels with access to a diversity of tools some of which are more dangerous than others. Being able to control access to tools increases safety, by not allowing those who are unskilled with tools have access to them.

SUMMARY

In a first aspect, the invention is a housing for a digital assistant. The housing includes; a body holding the digital assistant; and hardware to attach the body to an overhead mounting system. Within the housing there is at least one electrical input; and at least one electrical output, along with a digital current limiter. The digital assistant is capable of receiving and implementing instructions via voice commands or via a personal control device. The digital current limiter is adapted to, receive instructions from the digital assistant and in response to those instructions, regulate the current to components attached to the overhead mounting system.

In a second aspect, the invention is a method for creating a smart garage system including the step of providing a digital assistant in a housing as described in the first aspect. The method also includes the step of connecting at least one component to the electrical output of the housing. As such, access to the at least one component is restricted by commands given to the digital assistant.

In a third aspect, the disclosure provides a housing for a digital assistant, and attaching it to an overhead mounting system. The housing is designed to accommodate a digital assistant, so that the digital assistant can be attached to an overhead mounting system and connect to and in certain respects control devices also attached to the overhead mounting system. The housing is designed to protect the digital assistant from environmental hazards such as dirt and dust.

In a fourth aspect, the disclosure provides a housing that protects a digital assistant from environmental hazards. Garages and other workshop or storage locations are generally not kept as clean as most homes, therefore there are often more environmental hazards within these locations. It is possible to seal electronic devices against dust and dirt. A garage is often less weatherproof and thus there is more moisture in the air. Temperature can fluctuate from very cold to very hot, therefore it is desirable for the cover to incorporate temperature protections. The housing connects to electrical appliances connected in a chain configuration to each other and to a local source of electrical power. Each electrical appliance comprises electrical input, an electrical output, and a conductor comprising a current-limiting device with a current limit common to the plurality of electrical appliances. The conductor connects the electrical input and the electrical output. Each conductor has a current-carrying capacity greater than the current limit. The current limiter is also able to restrict the current flow to connected devices and prevent unauthorized use of those devices.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following description recites various aspects and embodiments of the inventions disclosed herein. This application incorporates by reference all the subject matter disclosed in the following references: U.S. patent application Ser. No. 15/441,928 by David R. Hall et al., filed Feb. 24, 2017 and entitled "Intelligent Current Limiting to Enable Chaining of AC Appliances"; U.S. patent application Ser. No. 15/443,312 by David R. Hall et al., filed Feb. 27, 2017 and entitled "Intelligent Current Limiting to Enable Chaining of DC Appliances"; U.S. patent application Ser. No. 15/443,434 by David R. Hall et al., filed Feb. 27, 2017 and entitled "Intelligent Current Limiting to Enable Chaining of AC and DC Appliances"; U.S. patent application Ser. No. 15/487,999 by David R. Hall et al., filed Apr. 14, 2017 and entitled "Overhead Mounting System"; U.S. patent application Ser. No. 15/488,860 by David R. Hall et al., filed Apr. 17, 2017 and entitled "Overhead Mounting System for Daisy-Chained Devices."

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "component" is meant to refer to all AC electrical appliances, DC electrical appliances, power tools, accessories and other objects that connect to the system, or mount to the overhead mounting system.

As used herein, "personal control device" is meant to refer to all smart phones; tablet computing devices, such as iPad or Galaxy Tab; laptop computers; or other computing devices.

As used herein, "digital assistant" is meant to refer computing devices that can be voice-controlled or operated from a "personal control device." including but not limited to: Amazon Echo, Amazon Echo Dot, Google Home, Google Home Mini, HomePod and Nest.

As used herein, 'nail head protrusion' is meant to refer to protrusions that resemble the head and a small portion of the body of a nail.

A detailed description of embodiments of an apparatus is provided below. Those of skill in the art will recognize that the features of the apparatus as described by example could be arranged and designed in a variety of different configurations without departing from the scope of the claims. Thus, the detailed description below and the depictions of embodiments in the figures are merely representative of the apparatus.

The housing and mount as described herein and depicted in the figures are useful for incorporating a voice-activated digital assistant into a smart home system. The digital assistant interconnects to other similar or dissimilar devices in a power supply scheme, such as is described in the Ser. Nos. 15/441,928, 15/443,312 and/or 15/443,434 applications. The digital assistant communicatively interconnects with one or more similar or dissimilar devices via a wireless network, such as a cloud-based network, directly via WIFI or Bluetooth, or via a wireless network.

In certain embodiments, the housing and mount are integrated into an overhead mounting system such as described U.S. patent application Ser. No. 15/487,999. The housing provides a convenient, low profile way to integrate one or more existing digital assistants into a smart system. For example, one or more of a variety of wirelessly networked devices are mounted to and/or powered by an overhead mounting system. The overhead mounting system is often implemented in a single room, such as a home garage and/or home workshop. In certain embodiments each device is controllable using voice commands. For example, each device is networked to a cloud-based server storing an application that centralizes processing and transmission of commands to the various smart devices. In one embodiment, each device is manufactured with a microphone and processor sufficient to process voice commands. However, for certain systems, which have many devices in a room, it presents a challenge to have every device "listening." This is especially true when each device requires voice setup for each device. Thus, it becomes convenient to centralize processing and transmission of voice commands using a digital assistant.

Preferably, the digital assistant receives commands for any networked device, processes the commands and transmit the commands to a cloud-based server for interpretation of the digitally-processed command into instructions, including identification of a device for which the command is intended and a function to be executed by the device. The cloud-based server then forwards the instruction to the intended device. Alternatively, the digital assistant locally stores the instructions for, and identification of, each interconnected smart device. Processing of the voice command is performed locally on the digital assistant, and interpretation and execution/transmission of the instructions also occur locally on the digital assistant. The digital assistant directly transmits operation instructions to the intended device. In some embodiments, voice command instructions include only commands to perform certain data processing and storage on the digital assistant and/or cloud-based server. For example, a user says "Revoke John's permissions for operating any networked device." The digital assistant and/or cloud-based server then removes from memory any stored recognition of the designated user's voice and permission to access the system by voice of the now non-permitted user. In some embodiments the digital assistant is set up to use a user's voice as his identification. This voice identification then uses the voice recognition to determine permissions for using attached components.

In other embodiments the digital assistant is programmed to use a personal control device as identification. The permissions for those users are associated with that specific personal control device. In some embodiments both types of user identification and commands will be used.

Accordingly, as described above, it is desirable to place a digital assistant in physical proximity of the devices a user wishes to operate by voice. Such environments are not conductive to the delicate and complex electronics required by many digital assistants, and a cover is necessary to shield the digital assistant at least partially from the surrounding environment. It is often useful to place the digital assistant in an out-of-the-way position while still providing power to the device and still retaining the device within audible range of a user. Mounting the digital assistant overhead to an overhead mounting system and interconnecting the power for the digital assistant to other devices powered along the overhead mounting system, provides superior convenience. The housing and mount as described herein accomplish such purposes.

In some embodiments the mounting hardware, also referred to as, the attachment bracket for mounting the digital assistant housing to the overhead mounting system is molded directly onto the digital assistant housing. In other embodiments there is an attachment bracket, which connects to the housing for the digital assistant via nail head protrusions and key slots. The attachment bracket has mounting protrusions molded into the vertical sides of the bracket that match with the openings in an overhead mounting system, additionally there is a mounting attachment molded to the base of the mounting bracket. The mounting attachment on the base of the mounting bracket is two molded protrusions that resemble the heads of a screw or nail. It is also possible to use screws or nails spaced in the appropriate places. Additionally, the housing for the digital assistant could be used without using the overhead mounted track.

The housing and mount are supplied with an electrical input and at least one electrical output for connecting, in series or parallel, the power supply for the digital assistant to other devices on the overhead mounting system. The housing and mount further include a separate power supply line, electrically connected with one or more of the input and output port by a voltage regulator, which supplies power to the digital assistant. The digital assistant is encased within the housing and mount, and the mount is mounted to the smart track. Alternatively, the cover is mounted to a wall using screw heads slipped into the key slots. Power may be supplied to the device from a standard 110V wall outlet.

Figure 1:
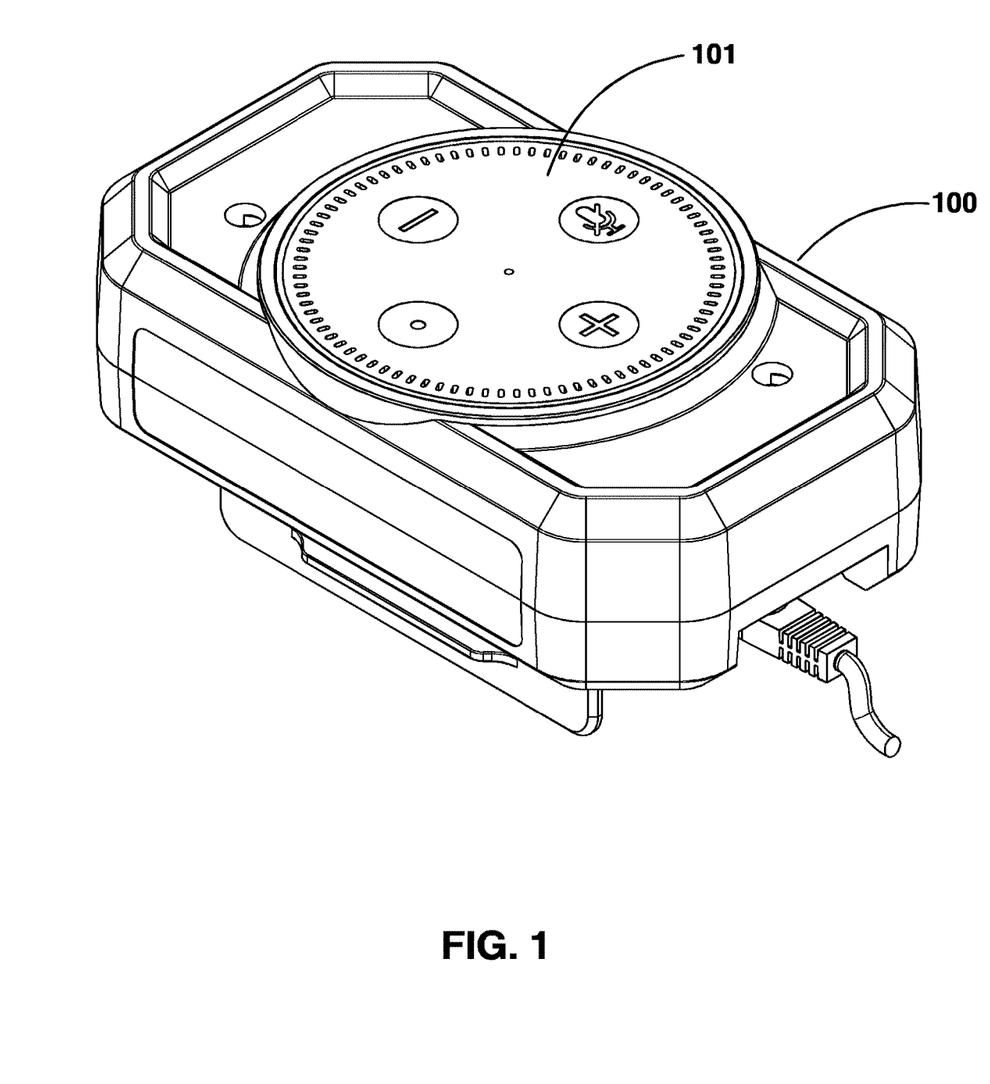
FIG. 1 is a perspective view of the housing with the digital assistant installed.

Now referring to FIG. 1, a digital assistant 101 installed in the housing 100. In some embodiments the digital assistant is programmed to identify users by voice recognition, the voice recognition acts as user identification and is tied to the permissions available to that user. The permissions include what components a user is able to access, how long the user is allowed to use those components. In some embodiments the digital assistant is configured to connect with a personal control device such as a smart phone or tablet. The personal control device contains the user identification and the digital assistant can recognize a user according to their personal control device. The permissions and restrictions for each user are associated with the user identification whether the means of identification is a personal control device or voice recognition. In certain embodiments the housing is waterproof. There are various methods to protect electronic devices from moisture and one skilled in the art will recognize which of these methods best applies to their needs. In some embodiments the housing is dustproof. In certain embodiments the housing provides protection from temperature fluctuations particularly against freezing.

Figure 2:
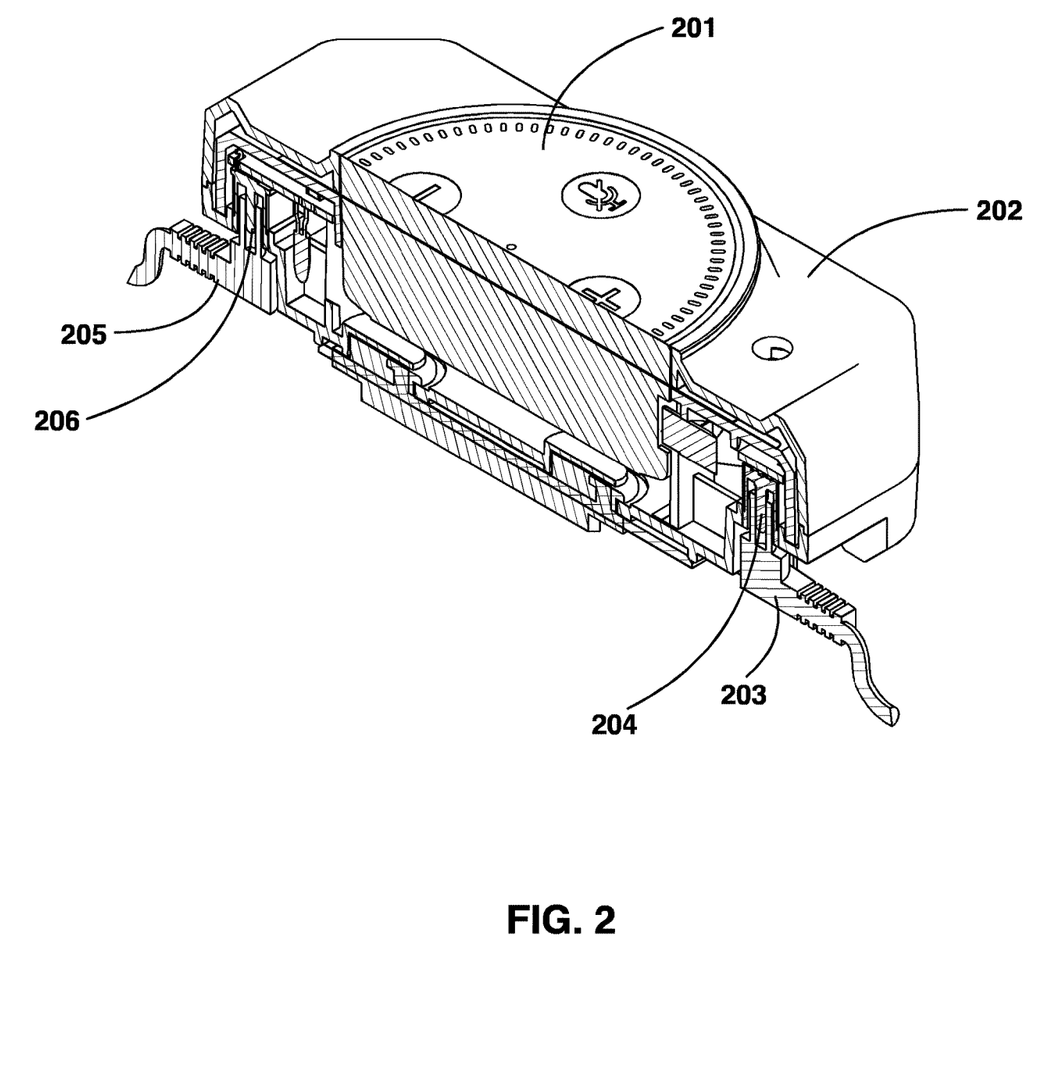
FIG. 2 is a transected view of the housing with the digital assistant installed.

Referring to FIG. 2, a digital assistant 201 is installed in the housing body 202. The housing body 202 fits snuggly around the digital assistant. The housing also allows the housing to be used in series or parallel with other devices, the power input cord 203 attaches to the power input port 204. Power output cord 205 can be plugged into power output port 206. This daisy chaining of the housing to other devices allows other devices to use the same power supply as the digital assistant, this allows multiple devices to be placed and used at a further distance from the power supply.

Figure 3:
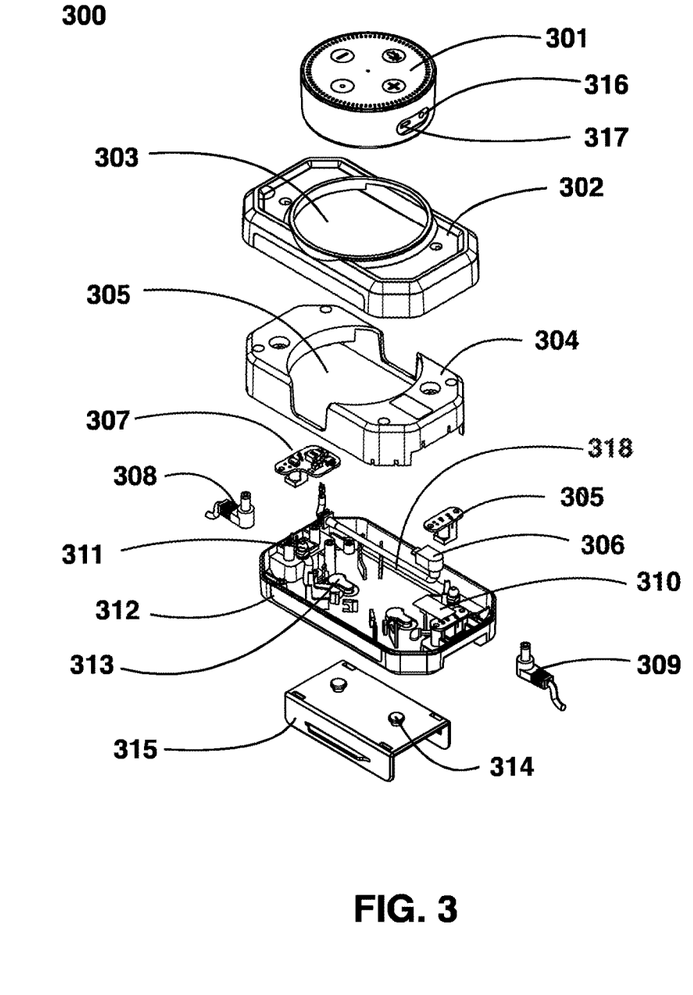
FIG. 3 is an exploded view of the housing and digital assistant.

Referring to FIG. 3, a digital assistant 301 is installed in openings 303 and 305 in the outer cover 302 and the cover frame 304. The outer cover 302 and cover frame 304, along with the cover base, make up the housing body, and provide support, structure and protection to the digital assistant 301 and the internal components of the digital assistant housing. The outer cover 302 provides environmental protection to the internal components of the housing and the digital assistant. The housing opening 303 fits snuggly around the digital assistant. The housing has adapters to fit into the ports of the digital assistant. In certain embodiments the outer cover 302 includes a transparent cover over the outer cover opening 303, the addition of the transparent cover enables the entire housing to be sealed from moisture and dust. In another embodiment the housing is designed to keep the digital assistant from freezing. This is preferably accomplished through specialized heating coils within the housing. The transparent cover is made of a material that allows the digital assistant to function regularly; the buttons are still accessible as are the speakers and microphone. The power adapter and voltage regulator 318 of the housing fits into the power socket 316 of the digital assistant. The micro usb adapter 306 of the housing fits into the micro usb port 317 of the digital assistant. The power adapter and voltage regulator 318 and the micro usb adapter provide the digital assistant 301 with the correct voltage necessary to power the digital assistant 301 without overloading the digital assistant. The housing also allows the cover to be used in series or parallel with other devices, the power input cord 309 attaches to the power input port 310. Power output cord can be plugged into power output port 311. This daisy chaining of the housing to other devices allows other devices to use the same power supply as the digital assistant, this allows multiple devices to be placed and used at a further distance from the power supply. The attachment bracket 315 attaches to the housing using 'nail head' protrusions on the attachment bracket that fit into keyhole slots 313 in cover base.

The digital assistant housing comprises an electrical input 310, an electrical output 311, and a conductor 318. The conductor 318 connects the electrical input 310 and the electrical output 311. Each conductor 318 comprises a current-limiting device 307 with a current limit common to the plurality of electrical appliances 100. In another embodiment, each current-limiting device 307 is a digital current limiter, which comprises a transistor, a microcontroller, and one or more sensors that monitor voltage and current. In one embodiment, the current limit is 10 amps. The conductor 318 has a current-carrying capacity greater than the current limit. In one embodiment, multiple components are connected in a chain configuration to each other and to a local source of electrical power in a parallel circuit. In a parallel circuit, the voltage across each electrical appliance stays constant, but the total current passing through the system is the sum of the currents through each electrical appliance. Therefore, although a single electrical appliance may not require its conductor to have a current-carrying capacity greater than the current limit common to the plurality of electrical appliances, as electrical appliances are added and connected to each other in a chain configuration, the current requirements of each electrical appliance in the chain add up, such that each electrical appliance could potentially need to carry the full current load of the sum of the current requirements of each electrical appliance in the chain, at least up to the current limit. Therefore, the conductor inside each electrical appliance must have a current-carrying capacity greater than the common current limit—in order for each electrical appliance in the chain to safely (i.e. without melting wires or starting a fire) carry the current of multiple electrical appliances chained together, up to the current limit.

Figure 4A:
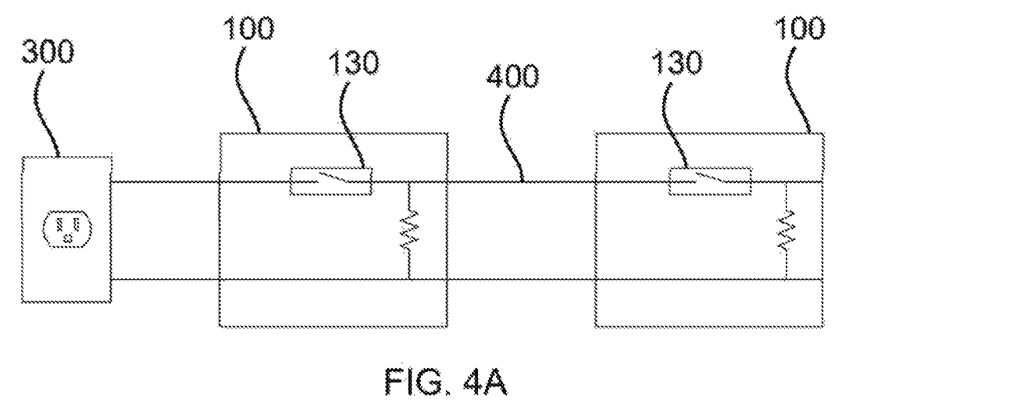
FIGS. 4A and 4B are diagrams of the current limiting device
Figure 4B:
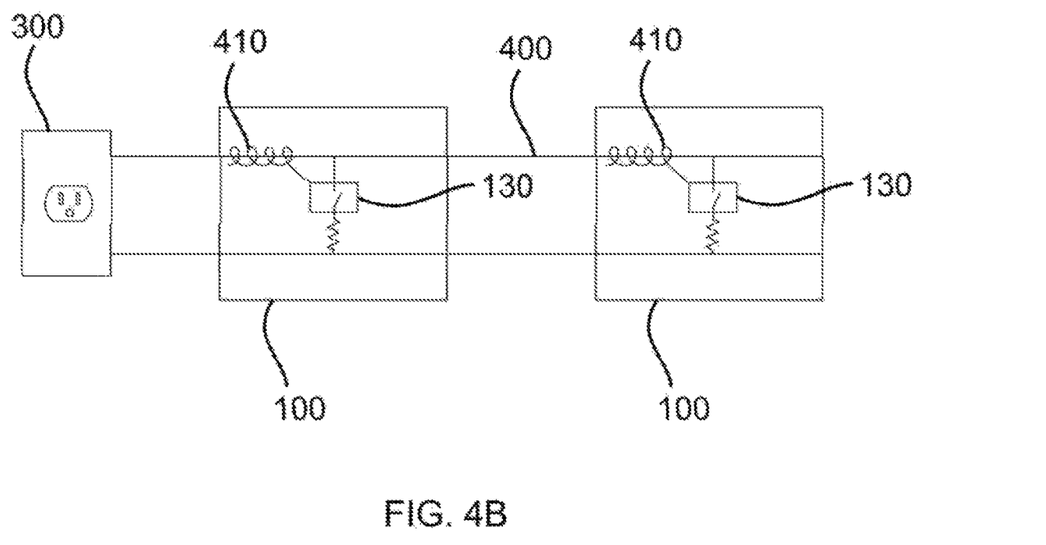

FIG. 4A and FIG. 4B depict embodiments of circuit diagrams of the current-limiting device 130 in each electrical appliance Each electrical appliance 100 comprises a conductor 140, which comprises an current-limiting device 130 with an current limit common to the plurality of electrical appliances 100. In one embodiment, each current-limiting device 130 is a breaker. In another embodiment, each current-limiting device 130 is a digital current limiter, which may comprise a transistor, a microcontroller, and one or more sensors that monitor voltage and current. In other embodiments, each current-limiting device 130 may be another type of circuit protection device. The current-limiting device 130 in at least one of the plurality of electrical appliances 100 limits a flow of current in the conductor 140 when the flow of current within the conductor 140 approaches the current limit. In one embodiment, the current limit is 10 amps. In another embodiment, the current limit is 15-20 amps, which is the same as the current limit of a standard wall outlet. Importantly, the current-limiting devices 130 in each of the plurality of electrical appliances 100 in the chain configuration share a common current limit.

In one embodiment, the current-limiting device 130 in each of the plurality of electrical appliances 100 is located along the main circuit 400, on the live wire, that connects each electrical appliance 100. This embodiment is depicted in FIG. 4A. The conductors 140 within each electrical appliance 100 are arranged in a parallel circuit, so that the total current through the plurality of electrical appliances 100 in the chain configuration is the sum of the currents through each electrical appliance 100. The conductor 140 in each electrical appliance 100 comprises a current-limiting device 130 with a current limit common to the plurality of electrical appliances 100. If an electrical appliance 100 is added to the chain that causes the sum of the currents through each electrical appliance 100 to approach the current limit, the current-limiting device 130 in one of the plurality of electrical appliances 100 is tripped and limits a flow of current in the conductor 140 of that electrical appliance 100.

In another embodiment, the current-limiting device 130 in the digital assistant housing comprises a current monitor 410 connected to a breaker located on a circuit that powers components of the AC electrical appliance 100. This embodiment is depicted in FIG. 4B. In this embodiment, a current monitor 410 is located on the main circuit 400 that connects each electrical appliance 100 to each other. If the current limit on the main circuit 400 is exceeded, a breaker connected to the current monitor 410 in one of the electrical appliances 100 that senses the overdraw trips. The breaker is located on a circuit that powers components of the electrical appliance 100. That electrical appliance 100 loses power to its components, causing it to lose function, but power is still passed through the electrical appliance 100 along the main circuit 400 to subsequent electrical appliances 100 in the chain.

In another embodiment the current-limiting device 130 in the digital assistant housing comprises a digital current limiter, which comprises a transistor, a microcontroller, and one or more sensors that monitor voltage and current. The digital current limiter regulates the current flow through the digital assistant housing and regulates the current received by components attached to the digital assistant housing.

Figure 5:
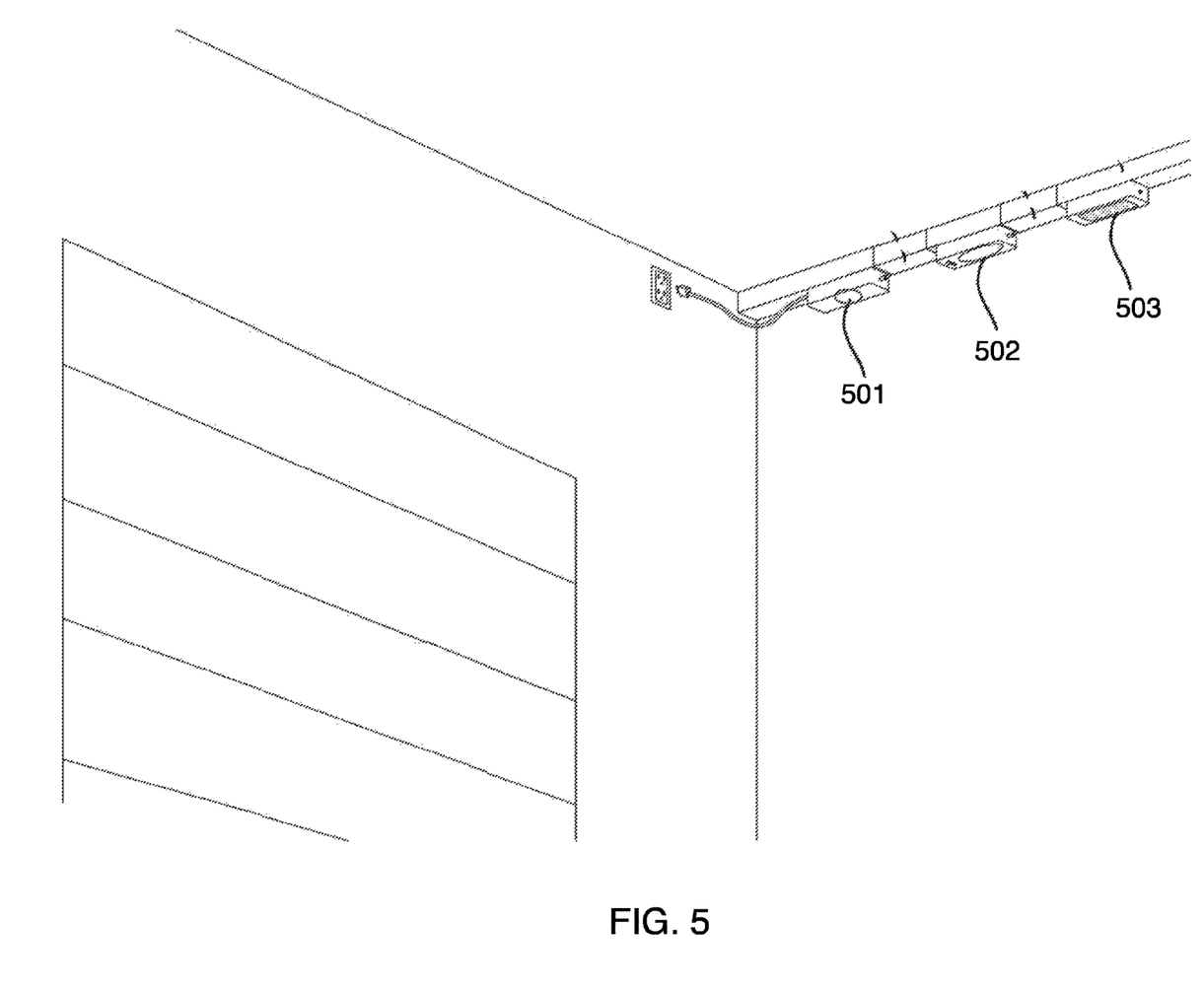
FIG. 5 is a view of the digital assistant installed in the housing, mounted to an overhead mounting system and connected to other components.

In another embodiment the digital assistant and housing 501 are attached to an overhead mounting system, two components a speaker 502 and a light 503 are connected to the digital assistant and housing. The digital current limiter in the housing controls the flow of current to the speaker 502 and the light 503. In some embodiments the digital current limiter allows current to flow through to the speaker 502 and the light 503. In certain embodiments the digital current limiter cuts off flow to the speaker 502 and the light 503 until a user with correct permission accesses the speaker 502 or the light 503, at which time the digital current limiter allows current to the speaker 502 and the light 503.

Figure 6:
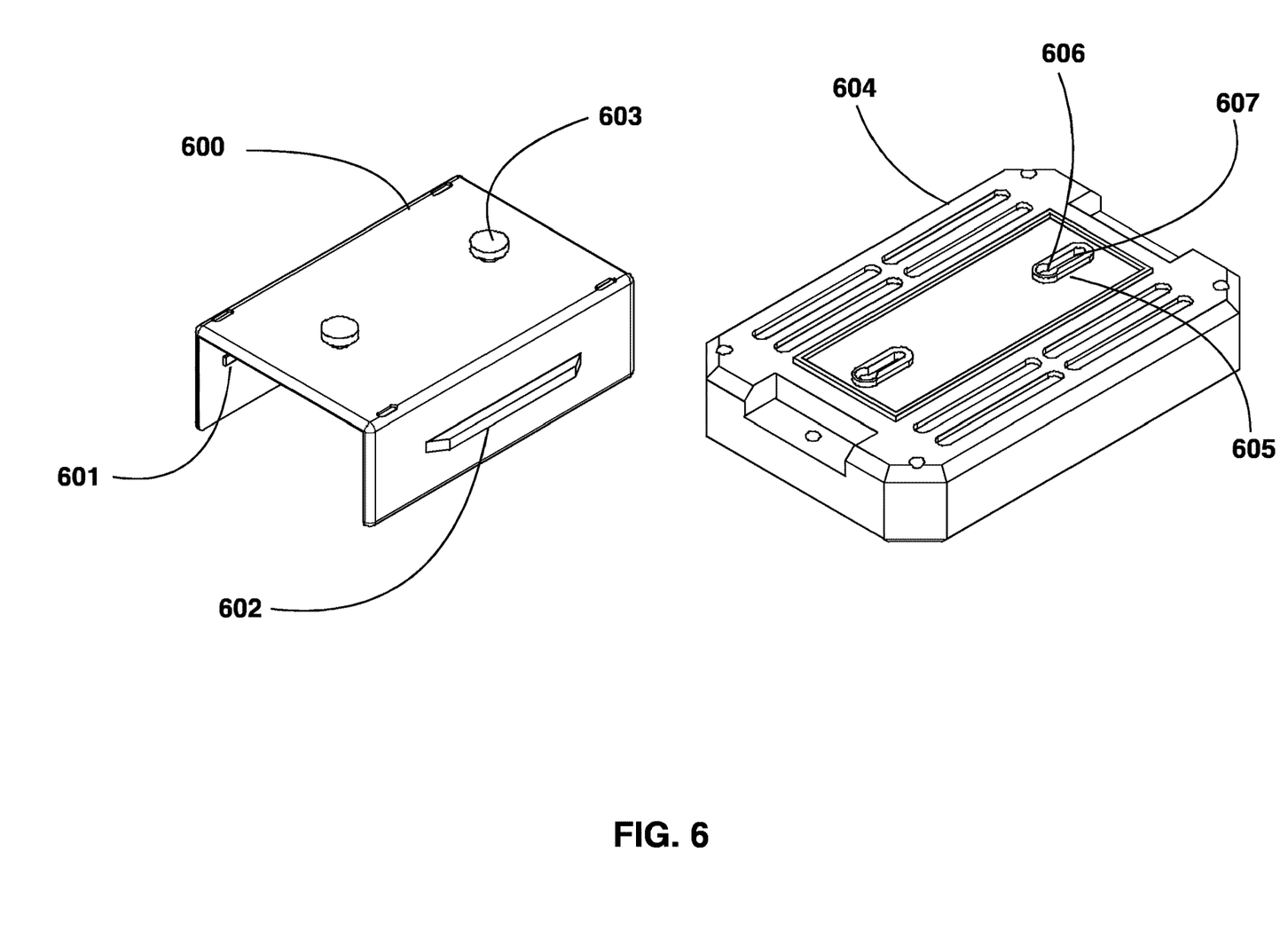
FIG. 6 is a view of the hardware to attach the housing to an overhead mounting system.

FIG. 6 shows the hardware for attaching the digital assistant to an overhead mounting system. The attachment bracket 600 is made of injection-molded plastic. The bracket attaches to the overhead mounting system and is kept in place by molded protrusions 601 that correspond to openings of the overhead mounting system. These molded protrusions 601 fit within the inter channel wall openings to lock the mounting bracket in place, this keeps the housing for the digital assistant attached to the bracket from sliding along the length of the overhead mounting system as well as from falling off the overhead mounting system. The mounting bracket also has a protrusion 603 on the base of the bracket; this protrusion is shaped like a nail or a screw with a 'head' having a larger diameter than the diameter of the 'neck'. The shape of this 'nail head' protrusion 603 functions in much the same way as a nail, the larger diameter of the 'head' functions to keep objects or materials from sliding past the 'head'. The digital assistant housing cover base 604 has corresponding keyholes 605 molded into it for attaching to the bracket. The molded nail head 603 fits into the hole 606 of the keyhole and slides along the neck 607 till it locks in place. The distance between the base of the bracket 600 and the underside of the 'nail head' 603 corresponds to the thickness of the molded plastic in the neck 607 of the keyhole 605, this creates a firm connection for the attachment of the accessory to the bracket.

All patents and patent applications referred to herein are incorporated herein by reference. The invention has been described with reference to various specific and preferred embodiments and techniques. Nevertheless, it understood that many variations and modifications might be made while remaining within the spirit and scope of the invention.

What is claimed is:

1. A housing for a digital assistant comprising:
   a body holding the digital assistant, and comprising keyholes;
   a bracket to attach the body to an overhead mounting system in a garage, the bracket comprising nail head protrusions;
   at least one electrical input;
   at least one electrical output to which components are connected in a chain configuration; and
   a digital current limiter connecting the at least one electrical input and at least one electrical output and controlling the flow of current through the at least one electrical output;
   a separate power supply line for powering the digital assistant;
   wherein the digital assistant is capable of receiving and implementing instructions via voice commands or via a personal control device; and
   wherein, the digital current limiter is adapted to, in response to instructions from the digital assistant, regulate the flow of current to components attached to the at least one electrical output;

wherein the nail head protrusions on the bracket fit within the keyholes of the body, enabling the body to be attached to and removed from the overhead mounting system.

2. The invention of claim 1, wherein the digital current limiter is adapted to, in response to instructions from the digital assistant, completely block current from passing to the connected components attached to the at least one electrical output.

3. The invention of claim 1, wherein the digital assistant is adapted to identify users.

4. The invention of claim 3, wherein users are identified through voice recognition.

5. The housing of claim 3, wherein users are identified through a program installed on their personal control device.

6. The invention of claim 3, wherein the digital assistant is adapted to restrict use of at least one of the components to one or more authorized users.

7. The invention of claim 1, wherein the digital assistant is adapted to communicate with and send instructions to the connected components.

8. The invention of claim 1, wherein the body is adapted to allow voice commands from a user to reach the digital assistant and audible feedback from the digital assistant to reach the user.

9. The invention of claim 8, wherein a speaker and microphone for the digital assistant are external to the body.

10. The invention of claim 9, wherein the body comprises apertures to allow audio signals to pass into and out of the body.

11. The invention of claim 1, wherein the body is waterproof.

12. The invention of claim 1, wherein the body is dustproof.

13. The invention of claim 1, further comprising heating coils within the body to provide protection against freezing temperatures.

14. The invention of claim 1, where the attachment hardware is removable.

15. A method for creating a smart garage system comprising:
   providing a digital assistant in a housing, the housing comprising;
   a body holding the digital assistant and comprising keyholes;
   a bracket to attach the body to an overhead mounting system, the bracket comprising nail head protrusions;
   at least one electrical input; at least one electrical output;
   providing an overhead mounting system;
   connecting at least one component to the electrical output to create a chain configuration;
   connecting the housing and the at least one component to the overhead mounting system; and
   providing in the housing a digital current limiter connecting the at least one electrical input and at least one electrical output and controlling the flow of current through from the at least one electrical output;
   a separate power supply line for powering the digital assistant;
   wherein the digital assistant is capable of receiving and implementing instructions via voice commands or via a personal control device; and
   wherein connecting the at least one component to the at least one electrical output of the housing creates a system of connected components;
   wherein, the digital current limiter is adapted to, in response to instructions from the digital assistant, regulate the flow of current to the at least one component attached to the at least one electrical output wherein the nail head protrusions on the bracket fit within the keyholes of the body enabling the body to be attached to and removed from the overhead mounting system.

16. The invention of claim 15, wherein the digital assistant is adapted to identify users and to restrict access to the at least one connected component to a subset of authorized users.

17. The invention of claim 16, wherein access is restricted by blocking current to the at least one connected component unless an authorized user is identified.

18. The invention of claim 15, further comprising a second electrical outlet with at least one second component connected thereto, and wherein current to the at least one second connected component is not regulated by the digital current limiter.

19. The invention of claim 16, further comprising a second electrical outlet with at least one second component connected thereto, wherein current to the at least one second connected component is regulated by the digital current limiter, and wherein all users are allowed to access the at least one second component.

20. The method of claim 16, wherein the users are identified by voice recognition.

* * * * *